(12) United States Patent
Ahmed et al.

(10) Patent No.: US 9,700,882 B2
(45) Date of Patent: Jul. 11, 2017

(54) ZINC-BASED NANOHYBRIDS, DEVICES AND METHODS THEREOF

(71) Applicant: Umm Al-Qura University, Makkah (SA)

(72) Inventors: Saleh Abdel-Mgeed Ahmed, Makkah (SA); Zaki Shakir Seddigi, Makkah (SA)

(73) Assignee: Umm Al-Qura University, Makkah (SA)

( * ) Notice: Subject to any disclaimer, the term of this patent is extended or adjusted under 35 U.S.C. 154(b) by 0 days.

(21) Appl. No.: 14/789,662

(22) Filed: Jul. 1, 2015

(65) Prior Publication Data

US 2017/0001186 A1   Jan. 5, 2017

(51) Int. Cl.
*B01J 31/18* (2006.01)
*C02F 1/30* (2006.01)
*C07F 3/06* (2006.01)
*B01J 35/00* (2006.01)
*B01J 35/02* (2006.01)
*C02F 1/72* (2006.01)
*C02F 101/30* (2006.01)
*C02F 1/32* (2006.01)

(52) U.S. Cl.
CPC .......... *B01J 31/183* (2013.01); *B01J 35/004* (2013.01); *B01J 35/023* (2013.01); *C02F 1/725* (2013.01); *B01J 2531/26* (2013.01); *C02F 1/30* (2013.01); *C02F 1/32* (2013.01); *C02F 2101/308* (2013.01); *C02F 2305/10* (2013.01)

(58) Field of Classification Search
None
See application file for complete search history.

(56) References Cited

U.S. PATENT DOCUMENTS 7,732,229 B2   6/2010   Leidholm et al.

OTHER PUBLICATIONS

Ghanem et al. (Spectrochimica Acta Part A, 72, 2009, 455-459.*
Masilela et al. (Journal of Porphyrins and Phthalocyanines, Nov. 2010, vol. 14, No. 11: pp. 985-992.*
Yoshida et al. (Advanced Functional Materials, 2009, 19, 17-43.*
Ghanem, "Photosensitization of SnO(2)/ZnO semiconductors with zinc-phthalocyanine.", *Spectrochim Acta A Mol Biomol Spectrosc.* Apr. 2009;72(3):455-9. doi: 10.1016/j.saa.2008.09.032. Epub Nov. 1, 2008, http://www.ncbi.nlm.nih.gov/pubmed/19129007.
Reddy, el al., "Efficient Sensitization of Nanocrystalline TiO2 Films by a Near-IR-Absorbing Unsymmetrical Zinc Phthalocyanine", Angewandte Chemie International Edition vol. 46, Issue 3, pp. 373-376, Jan. 8, 2007, http://onlinelibrary.wiley.com/doi/10.1002/anie.200603098/full.
Melis, et al., "Molecular Self-Assembling on ZnPc/ZnO Hybrid Interfaces for Photovoltaic Applications: A Combination of Metadynamics and Metropolis Montecarlo Simulations", Sep. 10, 2012 to Sep. 14, 2012, CECAM Conference: "Energy from the Sun: Computational Chemists and Physicists Take up the Challenge", http://www.cecam.org/workshop-4-820.html?presentation_id=8315.

* cited by examiner

*Primary Examiner* — Yun Qian
(74) *Attorney, Agent, or Firm* — Oblon, McClelland, Maier & Neustadt, L.L.P.

(57) ABSTRACT

A zinc-based nanohybrid was prepared using a facile wet chemistry process. This nanohybrid has zinc oxide nanostructures connected to zinc phthalocyanine molecules via biologically important ligands. In addition, this nanohybrid has photocatalytic properties and photodegrades water pollutants, such as methyl orange.

18 Claims, 9 Drawing Sheets

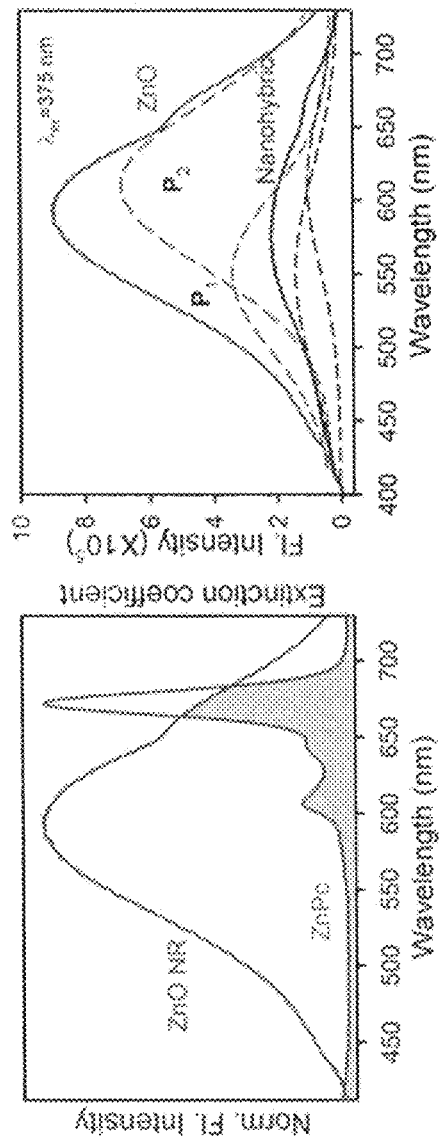
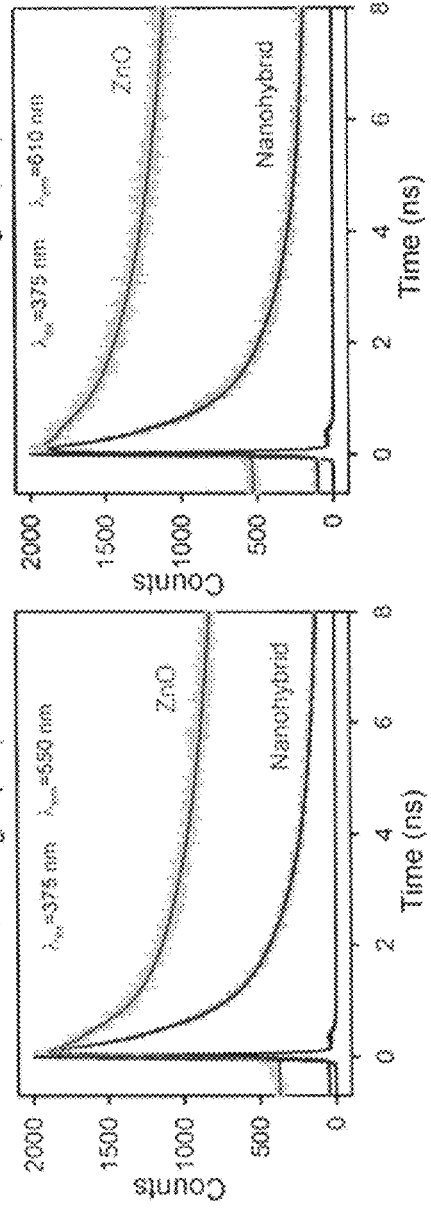
FIG. 6A  FIG. 6B  FIG. 6C  FIG. 6D

ZINC-BASED NANOHYBRIDS, DEVICES AND METHODS THEREOF

BACKGROUND OF THE INVENTION

Technical Field

The present invention relates to a photocatalyst, and the method of using this catalyst in water purification and photovoltaic systems. More specifically, the present invention relates to a zinc-based nanohybrid containing zinc oxide nanostructures, zinc phthalocyanine molecules and bridging ligands between the nanostructures and the zinc phthalocyanine molecules.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The choice of photosensitizers is crucial in light-harvesting applications such as dye-sensitized solar cells (DSSC) and visible light photocatalysis (VLP). Polypyridyl ruthenium complexes are commonly used because they absorb strongly in the ultraviolet (UV) and visible region (M. Grätzel, Acc. Chem. Res. 42 (2009) 1788-1798; B. Oregan, M. Gratzel, Nature 353 (1991) 737-740; A. Makhal, S. Sarkar, T. Bora, S. Baruah, J. Dutta, A. K. Raychaudhuri, S. K. Pal, J. Phys. Chem. C 114 (2010) 10390-10395; C.-Y. Chen, J.-G. Chen, S.-J. Wu, J.-Y. Li, C.-G. Wu, K.-C. Ho, Angew. Chem. Int. Ed. 47 (2008) 7342-7345—each incorporated herein by reference in its entirety). However, they have a low absorption in the near infrared (IR) region. Therefore, extending the response of the photosensitizers to the near IR region is essential to improve the efficiency of light-harvesting devices (M. Garcia-Iglesias, J.-J. Cid, J.-H. Yum, A. Forneli, P. Vazquez, M. K. Nazeeruddin, E. Palomares, M. Gratzel, T. Torres, Energy Environ. Sci. 4 (2011) 189-194—incorporated herein by reference in its entirety). Phthalocyanines are a class of aromatic macrocyclic tetradentate ligands, and they have been used in polymer-based DSSC to complement the absorption of the polymer in the red region of the solar spectrum (S. D. Oosterhout, M. M. Wienk, S. S. van Bavel, R. Thiedmann, L. Jan Anton Koster, J. Gilot, J. Loos, V. Schmidt, R. A. J. Janssen, Nat Mater 8 (2009) 818-824—incorporated herein by reference in its entirety). They coordinate to metal cations, forming metallophthalocyanines. Zinc phthalocyanines are a class of phthalocyanines whose main electronic features are explained using density function theory (DFT) (G. Mattioli, C. Melis, G. Malloci, F. Filippone, P. Alippi, P. Giannozzi, A. Mattoni, A. Amore Bonapasta, J. Phys. Chem. C 116 (2012) 15439-15448—incorporated herein by reference in its entirety). The phthalocyanine ligands in the prior art are usually chemically modified to add functional groups to improve their photocatalytic and physical properties (G. de la Torre, C. G. Claessens, T. Torres, Chem. Commun. (2007) 2000-2015; L. Giribabu, C. Vijay Kumar, V. Gopal Reddy, P. Yella Reddy, C. Srinivasa Rao, S.-R. Jang, J.-H. Yum, M. K. Nazeeruddin, M. Grätzel, Sol. Energ. Mat. Sol. Cells 91 (2007) 1611-1617; S. Mori, M. Nagata, Y. Nakahata, K. Yasuta, R. Goto, M. Kimura, M. Taya, J. Am. Chem. Soc. 132 (2010) 4054-4055; J. He, A. Hagfeldt, S.-E. Lindquist, H. Grennberg, F. Korodi, L. Sun, B. Åkermark, Langmuir 17 (2001) 2743-2747; G. Bottari, G. de la Tone, D. M. Guldi, T. Tones, Chem. Rev. 110 (2010) 6768-6816; M. K. Nazeeruddin, R. Humphry-baker, M. Gräzel, D. Wöhrle, G. Schnurpfeil, G. Schneider, A. Hirth, N. Trombach, J. Porphyrins Phthalocyanines 03 (1999) 230-237—each incorporated herein by reference in its entirety). These ligands often involve tedious multi-step syntheses (P. Y. Reddy, L. Giribabu, C. Lyness, H. J. Snaith, C. Vijaykumar, M. Chandrasekharam, M. Lakshmikantam, J. Yum, K. Kalyanasundaram, M. Gratzel, M. K. Nazeeruddin, Angew. Chem. Int. Ed. 46 (2007) 373-376; J. He, G. Benkö, F. Korodi, T. Polivka, R. Lomoth, B. Akermark, L. Sun, A. Hagfeldt, V. Sundström, J. Am. Chem. Soc. 124 (2002) 4922-4932—each incorporated herein by reference in its entirety).

Conventional water disinfection methods, such as chlorination and ozonization, have limitations because they are expensive, time-consuming, and produce harmful by-products. In order to overcome these inadequacies, many efforts have been carried out to develop more effective water disinfection methods that are environment friendly, cost effective, and highly efficient (S. Malato, P. Fernández-Ibáñez, M. I. Maldonado, J. Blanco, and W. Gernjak, Catalysis Today 147 (2009) 1-59; Jori, M. Magaraggia, C. Fabris, Journal of Environmental Pathology, Toxicology and Oncology 30 (2011) 261-271; M. Muruganandham, R. P. S. Suri, Sh. Jafari, International Journal of Photoenergy 2014 (2014) Article ID 821674, 21 pages—each incorporated herein by reference in its entirety). Towards this goal, photosensitizers, such as porphyrins and phthalocyanines, have been explored for the degradation and removal of toxins, dyes, and other unwanted impurities from water sources (S. Malato, P. Fernández-Ibáñez, M. I. Maldonado, J. Blanco, and W. Gernjak, Catalysis Today 147 (2009) 1-59; P. Kluson, M. Drobek, S. Krejcikova, Applied Catalysis B: Environmental 80 (2008) 321-326—each incorporated herein by reference in its entirety). Upon light irradiation in the presence of oxygen, photosensitizers produce reactive oxygen species (ROS) that are capable of killing bacteria, fungi, and viruses and cause the oxidation of unwanted contaminants present in water (S. Malato, P. Fernández-Ibáñez, M. I. Maldonado, J. Blanco, and W. Gernjak, Catalysis Today 147 (2009) 1-59; G. Joni, M. Magaraggia, C. Fabris, Journal of Environmental Pathology, Toxicology and Oncology 30 (2011) 261-271; M. N. Chong, B. Jin, C. W. K. Chow, and C. Saint, Water Research 44 (2010) 2997-3027; M. C. DeRosa and R. J. Crutchley, Coordination Chemistry Reviews 233-234 (2002) 351-371; Ž. Lukšienė, Food Technology and Biotechnology, 43 (2005) 411-418—each incorporated herein by reference in its entirety). However, these phthalocyanine molecules, similarly to those used in DSSC, require multi-step syntheses in order to incorporate functional groups in the fused benzene rings to improve their solubility in water.

In view of the forgoing, the objective of the present invention is to provide a zinc metallophthalocyanine-based nanohybrid, a substrate and a dye decontaminating device containing the nanohybrid, and a method for degrading a dye using the nanohybrid.

BRIEF SUMMARY OF THE INVENTION

According to the first aspect, the present disclosure relates to a zinc-based nanohybrid, comprising a zinc oxide nanostructure, a zinc phthalocyanine molecule, and a bridging ligand between the zinc oxide nanostructure and the zinc phthalocyanine molecule.

In one embodiment, the zinc oxide nanostructure has at least one of the morphologies selected from the group consisting of a nanoparticle, and a nontubular nanorod.

In one embodiment, the zinc nanostructure is a nontubular nanorod that has an average largest diameter of 50-100 nm and a length of 0.3-5 μm.

In one embodiment, the zinc nanostructure is a nanoparticle that has an average diameter of 10-50 nm.

In one embodiment, the zinc phthalocyanine molecule is of Formula (I):

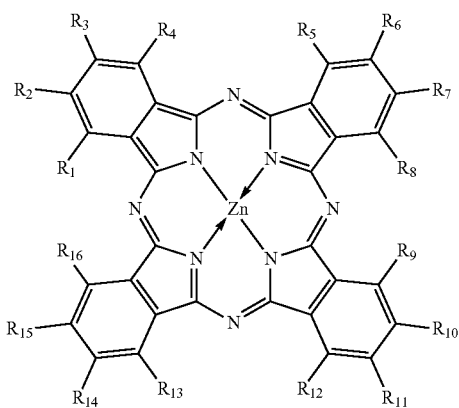

(I)

wherein $R_1$-$R_{16}$ are each independently a hydrogen, a halogen, a hydroxyl, an amino, an alkoxy, an aryloxy, a nitro, a cyano, an optionally substituted $C_1$-$C_8$ alkyl, an optionally substituted cycloalkyl, an optionally substituted heterocyclyl, an optionally substituted arylalkyl, an optionally substituted heteroaryl, an optionally substituted alkoxyl, an optionally substituted thioalkoxyl, an optionally substituted aryl, a N-monosubstituted amino group, or a N,N-disubstituted amino group.

In one embodiment, the zinc phthalocyanine molecule is of Formula (I), where $R_1$-$R_{16}$ are each hydrogen.

In one embodiment, the bridging ligand has two terminal carboxylate groups, and through these groups, the bridging ligand forms a Zn—O linkage with zinc in the zinc oxide nanostructure and another Zn—O linkage with zinc in the zinc phthalocyanine molecule.

In one embodiment, the bridging ligand molecule is of Formula (II):

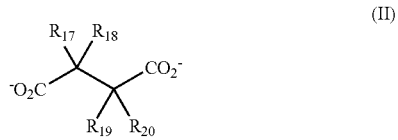

(II)

wherein $R_{17}$-$R_{20}$ are each independently a hydrogen, a halogen, a hydroxyl, an amino, an alkoxy, an aryloxy, a nitro, a cyano, an optionally substituted $C_1$-$C_8$ alkyl, an optionally substituted cycloalkyl, an optionally substituted heterocyclyl, an optionally substituted arylalkyl, an optionally substituted heteroaryl, an optionally substituted alkoxyl, an optionally substituted thioalkoxyl, an optionally substituted aryl, a N-monosubstituted amino group, or a N,N-disubstituted amino group.

In one embodiment, the bridging ligand is selected from the group consisting of citrate, tartrate, an amino acid, which is serine, cysteine, aspartate, glutamate or tyrosine, and enantiomers thereof.

According to a second aspect, the present disclosure relates to a substrate that has at least one plate, and the zinc-based nanohybrid is coated on a surface of the plate to form a zinc-based nanohybrid coating.

In one embodiment, the plate is selected from the group consisting of an indium tin oxide plate, a fluorine-doped tin oxide plate, and a quartz glass plate.

In one embodiment, the thickness of the zinc-based nanohybrid coating is 0.5-10 μM.

In one embodiment, the zinc-based nanohybrid coating has a surface roughness 10-70 nm.

In one embodiment, the zinc-based nanohybrid coating has a porosity of 5-45%.

In one embodiment, the zinc-based nanohybrid coating is porous with an average pore size of is 0.1-1 μm.

According to a third aspect, the present disclosure relates to a dye decontamination device, comprising the substrate, a container with a dye-containing aqueous solution, a receiving container to collect a decontaminated aqueous solution (wherein the substrate, the container filled with the dye-containing aqueous solution, and the receiving container are fluidly connected together), a pump configured to pump the dye-containing aqueous solution sequentially from the container with the dye-containing aqueous solution through the substrate to the receiving container, and a light source configured to irradiate the dye-containing aqueous solution that is in contact with the substrate to degrade and remove a dye from the dye-containing solution to form the decontaminated aqueous solution.

In one embodiment, the light source irradiates the dye-containing aqueous solution that is in contact with the substrate with a light having wavelength of 620-680 nm.

According to a fourth aspect, the present disclosure relates to a method for degrading one or more dye compounds from an aqueous sample, comprising contacting the aqueous sample with the zinc-based nanohybrid in the presence of light to photodegrade one or more dye compounds.

In one embodiment, the light has a wavelength of 620-680 nm.

In one embodiment, the dye compound is selected from the group consisting of azo dyes and fluorone dyes. The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 6A is a graph that shows the fluorescence emission spectrum of ZnO NRs and the UV-Vis absorption spectrum of ZnPc.

FIG. 6B is a graph that shows the deconvolution of the fluorescence emission spectrum of ZnO NRs and zinc-based nanohybrid into two peaks ($P_1$ and $P_2$) respectively.

FIGS. 6C and 6D are graphs that show the picosecond-resolved emission transients of ZnO NRs and zinc-based nanohybrid detected at $P_1$, 550 nm (FIG. 6C) and $P_2$, 610 nm (FIG. 6D), respectively.

DETAILED DESCRIPTION OF THE EMBODIMENTS

Figure 1A:
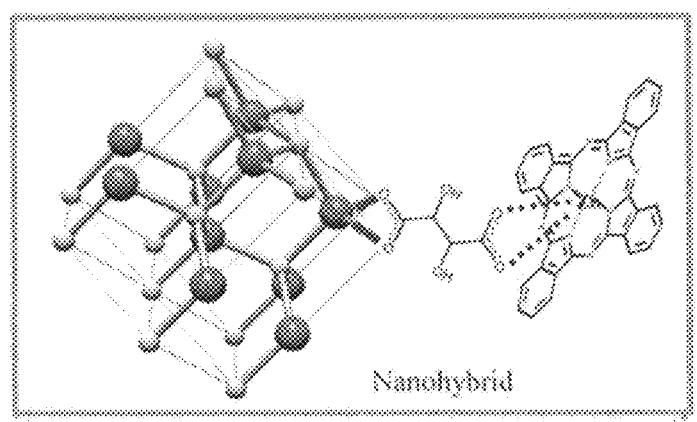
FIG. 1A illustrates the zinc-based nanohybrid, indicating the attachment of zinc phthalocyanine (ZnPc) to zinc oxide (ZnO) through the tartrate ligand.

Embodiments of the present disclosure will now be described more fully hereinafter with reference to the accompanying drawings, in which some, but not all embodiments of the disclosure are shown.

The present disclosure will be better understood with reference to the following definitions:

As used herein, the term "hybrid" is intended to refer to a multiphase material where one of the phases could be an inorganic solid while the other phase could be an organic or organometallic material, whether in a crude mixture or purified. The term "nanohybrid" is intended to refer to a hybrid where one of the phases has one, two or three dimensions of 0.1-100 nm, whether in a crude mixture or purified.

The term "nanostructure", as used herein, and unless otherwise specified, refers to a solid that has one, two or three dimensions with a diameter of 0.1-100 nm, whether in a crude mixture or purified.

The term "nanoparticle", as used herein, and unless otherwise specified, refers to a solid sphere or spheroid that has a diameter of 0.1-100 nm.

For materials with a polygonal shape, the term "diameter", as used herein, and unless otherwise specified, refers to the greatest possible distance measured from a vertex of a polygon through the center of the face to the vertex on the opposite side. For spheres and spheroids, "diameter" refers to the greatest possible distance measured from one point on the sphere through the center of the sphere to a point directly across from it.

The terms "compound", "molecule", "ligand" and "complex", as used herein, and unless otherwise specified, are intended to refer to a chemical entity, whether in the solid, liquid or gaseous phase, and whether in a crude mixture or purified and isolated.

The term "alkyl", as used herein, unless otherwise specified, refers to a saturated straight, branched, or cyclic, primary, secondary, or tertiary hydrocarbon of typically $C_1$ to $C_8$, and specifically includes methyl, trifluoromethyl, ethyl, propyl, isopropyl, cyclopropyl, butyl, isobutyl, t-butyl, pentyl, cyclopentyl, isopentyl, neopentyl, hexyl, isohexyl, cyclohexyl, cyclohexylmethyl, 3-methylpentyl, 2,2-dimethylbutyl, and 2,3-dimethylbutyl. The term optionally includes substituted alkyl groups. Moieties with which the alkyl group can be substituted are selected from the group consisting of hydroxyl, carboxyl, amino, alkylamino, arylamino, alkoxy, aryloxy, nitro, or cyano, either unprotected, or protected as necessary, as known to those skilled in the art, for example, as taught in Greene, et al., "Protective Groups in Organic Synthesis", John Wiley and Sons, Second Edition, 1991, hereby incorporated by reference in its entirety.

The term "aryl", as used herein, and unless otherwise specified, refers to phenyl, biphenyl, or naphthyl, and preferably phenyl. The term includes both substituted and unsubstituted moieties. The aryl group can be substituted with one or more moieties selected from the group consisting of hydroxyl, carboxyl, amino, alkylamino, arylamino, alkoxy, aryloxy, nitro, or cyano, either unprotected, or protected as necessary, as known to those skilled in the art, for example, as taught in Greene, et al., "Protective Groups in Organic Synthesis", John Wiley and Sons, Second Edition, 1991, hereby incorporated by reference in its entirety.

The term "azo", as used herein, and unless otherwise specified, refers to compounds containing at least one functional group R—N=N—R', where R and R' can be either the same or different chemical moieties, and they can independently be an optionally substituted $C_1$-$C_8$ alkyl, an optionally substituted cycloalkyl, an optionally substituted heterocyclyl, an optionally substituted arylalkyl, an optionally substituted heteroaryl, an optionally substituted alkoxyl, an optionally substituted thioalkoxyl, an optionally substituted aryl.

The term "fluorone", as used herein, and unless otherwise specified, refers to compounds containing a core structure as shown below:

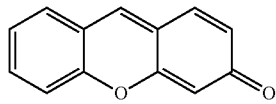

In addition to the core structure, fluorone compounds can be substituted where each substituent on the fused rings can independently be a hydrogen, a halogen, a hydroxyl, an amino, an alkoxy, an aryloxy, a nitro, a cyano, an optionally substituted $C_1$-$C_8$ alkyl, an optionally substituted cycloalkyl, an optionally substituted heterocyclyl, an optionally substituted arylalkyl, an optionally substituted heteroaryl, an optionally substituted alkoxyl, an optionally substituted thioalkoxyl, an optionally substituted aryl, a N-monosubstituted amino group, or a N,N-disubstituted amino group.

The present disclosure provides zinc-based nanohybrids having photocatalytic properties, preferably water purification properties. In these zinc-based nanohybrids, there is a zinc phthalocyanine molecule bound to a zinc oxide nanostructure, preferably bound by a ligand that is based on the tartrate functional group as shown below:

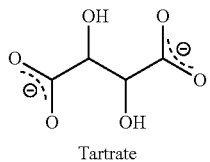
Tartrate

The tartrate-based ligand uses one of the terminal carboxylate groups to bind to the zinc in the zinc phthalocyanine molecule in a monodentate or multidentate manner and the other carboxylate group to bind to the zinc in the zinc oxide nanostructure, also in a monodentate or multidentate manner.

The present disclosure relates to a zinc-based nanohybrid, comprising a zinc oxide nanostructure, a zinc phthalocyanine molecule, and a bridging ligand between the zinc oxide nanostructure and the zinc phthalocyanine molecule.

In one embodiment, the zinc oxide nanostructure has at least one of the morphologies selected from the group consisting of a nanoparticle and a nontubular nanorod. In addition to a nanoparticle or nontubular nanorod morphology, it is envisaged that the zinc oxide nanostructure may have a morphology that includes, but is not limited to nontubular nanopolygon, nanoring, nanosheet, and nanofiber.

In a preferred embodiment, the zinc nanostructure is a nontubular nanorod that has an average largest diameter of 50-100 nm, preferably 60-100 nm, more preferably 70-100 nm, and a length of 0.3-5 μm, preferably 2-3 μm.

In another embodiment, the zinc nanostructure is a nontubular nanorod that has an average largest diameter of 1-50 nm, preferably 10-50 nm, more preferably 20-40 nm, and a length of 0.3-5 μm, preferably 2-3 μm.

In a preferred embodiment, the zinc nanostructure is a nanoparticle that has an average diameter of 10-50 nm, preferably 15-50 nm, more preferably 15-45 nm.

In another embodiment, the zinc nanostructure is a nanoparticle that has an average diameter of 50-100 nm, preferably 50-90 nm, more preferably 60-80 nm.

In one embodiment, the zinc nanostructure is a nontubular polygonal nanostructure that has an average diameter of 0.1-100 nm, preferably 10-100 nm, more preferably 20-100 nm, and a length of 0.1-5000 nm, preferably 10-5000 nm, more preferably 20-5000 nm.

In one embodiment, the zinc nanostructure is a nanoring that has an average inner diameter of 0.1-100 nm, preferably 5-95 nm, more preferably 10-80 nm, and an average outer diameter of 0.1-100 nm, preferably 10-100 nm, more preferably 20-90 nm, and a height of 0.1-50 nm, preferably 10-50 nm, more preferably 20-50 nm.

In one embodiment, the zinc nanostructure is a nanosheet with an average diameter of 0.1-100 nm, preferably 10-100 nm, more preferably 20-100 nm.

In one embodiment, the zinc nanostructure is a nanofiber with an average diameter of 0.1-25 nm, preferably 5-25 nm, more preferably 10-25 nm, and a length of 10-5000 nm, preferably 50-2500 nm, more preferably 100-1000 nm.

The present disclosure is intended to include all isotopes of atoms occurring in the present complexes. Isotopes include those atoms having the same atomic number but different mass numbers. By way of general example and without limitation, isotopes of hydrogen include deuterium and tritium. Isotopes of carbon include $^{13}C$ and $^{14}C$. Isotopically-labeled compounds of the disclosure can generally be prepared by conventional techniques known to those skilled in the art or by processes analogous to those described herein, using an appropriate isotopically-labeled reagent in place of the non-labeled reagent otherwise employed.

In one embodiment, the zinc phthalocyanine molecule is of Formula (I):

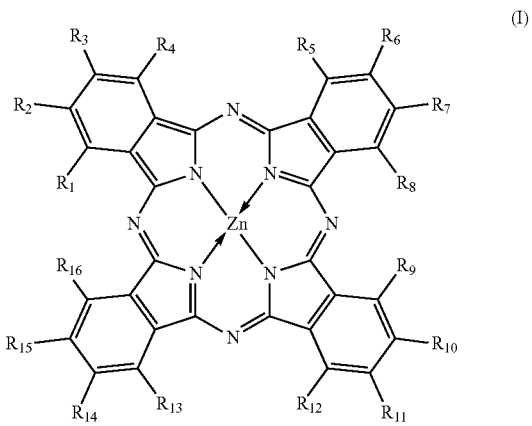

wherein $R_1$-$R_{16}$ are each independently a hydrogen, a halogen, a hydroxyl, an amino, an alkoxy, an aryloxy, a nitro, a cyano, an optionally substituted $C_1$-$C_8$ alkyl, an optionally substituted cycloalkyl, an optionally substituted heterocyclyl, an optionally substituted arylalkyl, an optionally substituted heteroaryl, an optionally substituted alkoxyl, an optionally substituted thioalkoxyl, an optionally substituted aryl, a N-monosubstituted amino group, or a N,N-disubstituted amino group.

In one embodiment, $R_1$-$R_{16}$ are each hydrogen.

In one embodiment, the bridging ligand has two terminal carboxylate groups, and through these two terminal carboxylate groups, it forms a Zn—O linkage with the zinc of the zinc oxide nanostructure and another Zn—O linkage with the zinc of the zinc phthalocyanine molecule. Under conditions in which the carboxylate groups of the bridging ligand are charged (i.e. when not in the form of a carboxylic acid), the carboxylate species are associated with a counterion. Examples of such counterions include but are not limited to cations of elements from Group 1-15 of the periodic table, polyatomic cations, including but not limited to ammonium, monoalkylammonium, polyalkylammonium, monoarylammonium, polyarylammonium, polyalkylphosphonium, and polyarylphosphonium.

In one embodiment, one of the carboxylate oxygen atoms binds to zinc in a monodentate manner via a non-ionic dative bond.

In another embodiment, where the bridging ligand has an electron-rich functional group in addition to the carboxylate group, the electron-rich functional group binds to zinc in a monodentate manner via a non-ionic dative bond.

In one embodiment, both carboxylate oxygen atoms bind to zinc in a bidentate manner via non-ionic dative bonds.

In another embodiment, where the bridging ligand has an electron-rich functional group α, β, or γ to the carboxylate group, the functional group and the carboxylate oxygen atom bind to zinc in a multidentate manner via non-ionic dative bonds.

In an alternative embodiment, a carboxylate group from the bridging ligand binds covalently and ionically to the zinc of the zinc phthalocyanine to form an anionic coordination complex, and the anionic coordination complex is associated with a cation. Exemplary cations are disclosed heretofore.

In one embodiment, the bridging ligand has a chemical structure shown below:

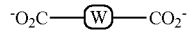

$$^-O_2C—W—CO_2^-$$

The W group is selected from, but not limited to the group consisting of an optionally substituted $C_1$-$C_8$ alkyl, an optionally substituted cycloalkyl, an optionally substituted heterocyclyl, an optionally substituted arylalkyl, an optionally substituted heteroaryl, and an optionally substituted aryl.

In one embodiment, the bridging ligand molecule is of Formula (II):

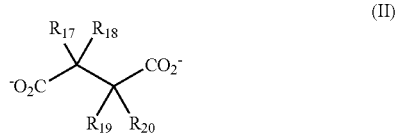

(II)

wherein $R_{17}$-$R_{20}$ are each independently a hydrogen, a halogen, hydroxyl, amino, alkoxy, aryloxy, nitro, cyano, an optionally substituted $C_1$-$C_8$ alkyl, an optionally substituted cycloalkyl, an optionally substituted heterocyclyl, an optionally substituted arylalkyl, an optionally substituted heteroaryl, an optionally substituted alkoxyl, an optionally substituted thioalkoxyl, an optionally substituted aryl, a N-monosubstituted amino group, or a N,N-disubstituted amino group.

In one embodiment, the bridging ligand is selected from the group consisting of citrate, tartrate, an amino acid, which is serine, cysteine, aspartate, glutamate or tyrosine, and enantiomers thereof. In one embodiment, the bridging ligand is L-serine. In another embodiment, the bridging ligand is citrate.

In a preferred embodiment, the bridging ligand is tartrate. In one embodiment, the oxygen of the α-hydroxyl group of tartrate binds to zinc in a monodentate manner via a non-ionic dative bond.

In one embodiment, the zinc-based nanohybrid can be a part of a mixture that includes the bridging ligand bound on both ends to zinc oxide nanostructures, and/or a bridging ligand bound on both ends to zinc phthalocyanine of Formula (I). In one embodiment, the mixture contains 80-99.99 wt % of the nanohybrid, preferably 90-99.99 wt %, more preferably 95-99.99 wt %, relative to the total weight of mixture.

In one embodiment, the amount of zinc phthalocyanine of Formula (I) in the nanohybrid is less than 50 wt %, preferably less than 40 wt %, more preferably less than 25 wt %, even more preferably less than 10 wt %, relative to the total weight % of the nanohybrid.

The present disclosure further relates to a substrate comprising at least one plate, and the zinc-based nanohybrid, in one or more of its embodiments, where the zinc-based nanohybrid is coated on a surface of the plate.

In one embodiment, the plate is selected from the group consisting of an indium tin oxide plate, a fluorine-doped tin oxide plate, and a quartz glass plate. These plates are non-porous and have a smooth surface.

In one embodiment, the zinc oxide nanorods are coated on a surface of a plate using a low temperature hydrothermal method. Initially, a zinc oxide seed thin film is embedded on the surfaces of cleaned plates by spray-pyrolysis at 90-300° C., preferably 90-200° C., more preferably 90-150° C. using a solution of a zinc salt (an example of which is zinc acetate) in a solvent, including but not limited to acetone, methanol, ethanol, isopropanol, and/or water. In one embodiment, the zinc salt is zinc acetate, and the concentration of zinc acetate in the solution is 1-50 mM, preferably 5-40 mM, more preferably 5-20 mM. In one embodiment, the zinc salt is zinc chloride. In another embodiment, the zinc salt is zinc nitrate. The seeded plates are annealed in air at 300-500° C., preferably 300-400° C., more preferably 320-360° C. for 1-10 h, preferably 2-8 h, more preferably 3-6 h. Subsequently, these plates are used for the hydrothermal growth of the zinc oxide nanorods. Aqueous solutions of a zinc salt (e.g. zinc nitrate) and an amine base (e.g. hexamethylenetetramine) are used as the precursor solutions for growing zinc oxide nanorods at 50-99° C., preferably 60-99° C., more preferably 80-95° C., for 20-60 h, preferably 30-50 h. In one embodiment, the zinc salt is zinc nitrate, the amine base is hexamethylenetetramine, and the concentrations of the zinc nitrate and hexamethylenetetramine solutions are 10-100 mM, preferably 10-80 mM, more preferably 10-50 mM. In another embodiment, the zinc salt is zinc acetate, the amine base is hexadecylamine. In another embodiment, the zinc salt is zinc chloride, the amine base is octylamine. The zinc oxide nanorods bind to the zinc oxide seed thin film via van der Waals forces. Finally, the seeded plates are annealed in air at 300-500° C., preferably 300-400° C., more preferably 320-360° C. for 0.5-10 h, preferably 0.5-8 h, more preferably 0.5-5 h.

The functionalization of zinc oxide nanorods with tartrate ligands (or alternatively any other bridging ligand mentioned previously) is carried out at temperatures 18-30° C., preferably 20-28° C., more preferably 24-26° C., in the dark by immersing the plates with zinc oxide nanorods into a tartrate aqueous solution (with a pH adjusted to 8-10 with an alkaline hydroxide solution) for 10-50 h, preferably 10-40 h, more preferably 10-20 h. The concentration of the tartrate solution is 0.1-2 mM, preferably 0.2-1 mM, more preferably 0.3-0.7 mM.

The sensitization of zinc oxide nanorods is carried out with a solution of a zinc phthalocyanine molecule of Formula (I) in a polar solvent, preferably a polar aprotic solvent such as dimethyl sulfoxide (DMSO) and dimethyl formamide (DMF). In one embodiment, the concentration of the zinc phthalocyanine solution is 0.1-2 mM, preferably 0.2-1 mM, more preferably 0.3-0.7 mM and the solution is stirred for 0.5-5 h, preferably 0.5-3 h, more preferably 0.5-2 h. The sensitization of the zinc oxide nanorods with a zinc phthalocyanine molecule of Formula (I) is carried out in darkness and at temperatures 18-30° C., preferably 20-28° C., more preferably 24-26° C. by dipping the tartrate-functionalized zinc nanorods into the zinc phthalocyanine solution for 2-48 h, preferably 4-36 h, more preferably 8-16 h.

In one embodiment, the zinc-based nanohybrid is first prepared by stirring zinc oxide nanostructures in a solution of tartrate (or alternatively any other bridging ligand mentioned previously), with a pH adjusted to 8-10 with an alkaline hydroxide solution, at temperatures 18-30° C., preferably 20-28° C., more preferably 24-26° C., in the dark for 5-50 h, preferably 5-40 h, more preferably 5-10 h. The concentration of the tartrate solution is 0.1-2 mM, preferably 0.2-1 mM, more preferably 0.3-0.7 mM. As a second step, 0.5-10 ml, preferably 0.5-5 ml, more preferably 0.5-2 ml of the tartrate-functionalized nanoparticles suspension is added to 0.5-10 ml, preferably 0.5-5 ml, more preferably 0.5-2 ml of the zinc phthalocyanine solution and then stirred at temperatures 18-30° C., preferably 20-28° C., more preferably 24-26° C., in the dark for 5-50 h, preferably 5-40 h, more preferably 10-20 h. The concentration of the zinc phthalocyanine solution is 0.1-2 mM, preferably 0.2-1 mM, more preferably 0.3-0.7 mM. As the last step, the suspension is then centrifuged for 1-20 min, preferably 1-10 min, more preferably 1-8 min, and the supernatant clear solution of unattached dyes is removed. In one embodiment, the zinc-based nanohybrid is re-suspended in a solvent, including but not limited to acetone, methanol, ethanol, isopropanol, and/or water. The concentration of the zinc-based nanohybrid suspension may be 0.1-10 wt %, preferably 0.1-5 wt %, more preferably 0.1-1 wt %, relative to the total weight % of the suspension. A volume of the suspension, 0.1-200 µL, preferably 0.1-10 µL, more preferably 0.1-50 µL is placed on a plate, and the plate is allowed to dry in air at temperatures 18-30° C., preferably 20-28° C., more preferably 24-26° C., in the dark for 0.5-10 h, preferably 0.5-8 h, more preferably 0.5-5 h.

In one embodiment, the zinc-based nanohybrid coating is 0.5-10 µm thick, preferably 1-8 µm, more preferably 2-4 µm.

In one embodiment, the zinc-based nanohybrid coating has a surface roughness that is 10-70 nm, preferably 15-60 nm, more preferably 20-40 nm.

In one embodiment, the zinc-based nanohybrid coating has a porosity of 5-45%, preferably 10-35%, more preferably 15-25%.

In one embodiment, the pore size of the coating is 0.1-1 µm, preferably 0.2-1 µm, more preferably 0.3-1 µm.

In a preferred embodiment, the substrate comprises two plates that form a channel, and the zinc-based nanohybrid is present on the surface of at least one plate such that the nanohybrid is located within the channel.

In one embodiment, the substrate may be utilized in photovoltaic systems. Components of the system include, for example, photovoltaic cells, thermoelectric cells, an electricity meter, an AC isolator, a fusebox, an inverter, a battery, a charge controller, a generation meter, a DC isolator, cables, and a tracking system.

In another embodiment, the substrate may be utilized in photocatalytic devices. Components of the device include, for example, light transmission panels, ultraviolet lamps, optical fiber cables, and a layer of photocatalyst supported on a panel.

Figure 1B:
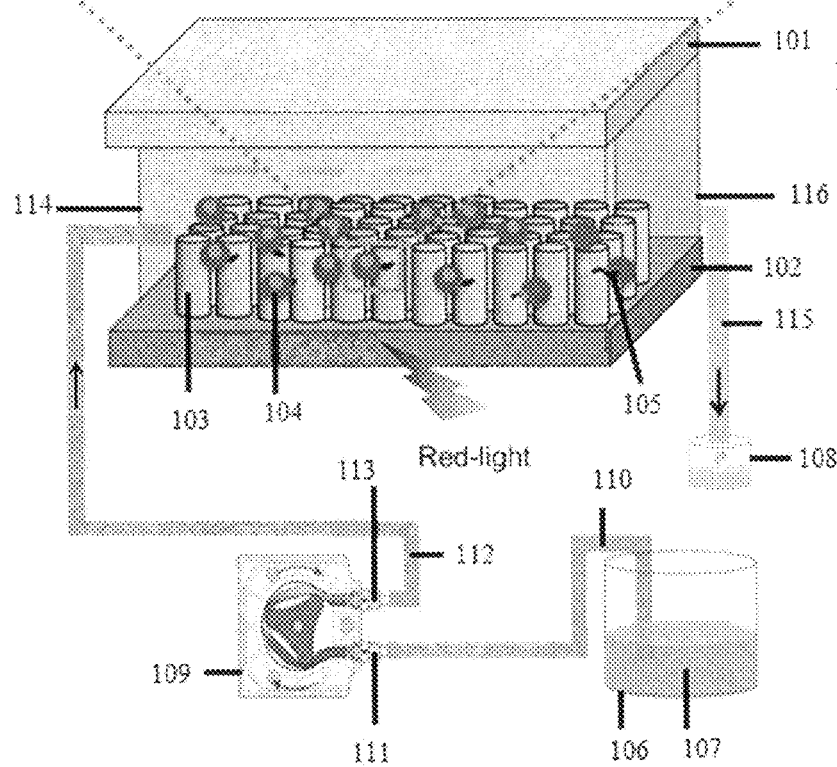
FIG. 1B is a schematic diagram of the water purification prototype containing the zinc-based nanohybrid.

Another embodiment of the present disclosure relates to a dye decontamination device (FIG. 1B), comprising the substrate which has a top plate 101 and a bottom plate 102, sandwiching a layer of zinc-based nanohybrid that contains zinc oxide nanostructures 103, zinc phthalocyanine molecules of Formula (I) 104, and bridging ligands 105, a container 106 filled with a dye-containing aqueous solution 107, a receiving container 108 to collect the aqueous solution (wherein the substrate, the container filled with the dye-containing aqueous solution, and the receiving container are fluidly connected together), a pump 109 configured to pump the dye-containing aqueous solution sequentially from the container filled with the dye-containing aqueous solution through the substrate to the receiving container, and a light source configured to irradiate the dye-containing aqueous solution that is in contact with the substrate.

In a preferred embodiment, this device has a tube 110 with a first end in the container with the dye-containing aqueous solution and a second end connected to the pump inlet 111, a second tube 112 having a first end connected to the pump outlet 113 and a second end of the tubing leading to an inlet 114 of the substrate, and a third tube 115 having a first end connected to a substrate outlet 116 and a second end of the tubing fluidly connected to the receiving container.

In one embodiment, the outer diameter of the first, second, and third tube is 1-20 mm, preferably 1-10 mm, more preferably 1-5 mm, although the tubing diameter may vary.

The tubing may be made of one or more types of material, including but not limited to polyurethane, nylon, polyethylene, polyvinyl chloride (PVC), polytetrafluoroethylene (PTFE), stainless steel, and brass.

Examples of the pump include but are not limited to centrifugal pump, circulator pump, diaphragm pump, bellows pump, drum pump, piston pump, syringe pump, and rotary vane pump.

In one embodiment, the light source emits a light with a wavelength of 620-680 nm, preferably 630-670 nm.

A further embodiment of the present disclosure relates to a method for degrading one or more dye compounds from an aqueous sample. In this method, the aqueous sample is in contact with the zinc-based nanohybrid in the presence of light to photodegrade one or more dye compounds.

In one embodiment, the photodegradation of dye compounds is carried out in a 10 mm optical path quartz cell reactor containing 0.5-5.0 mL, preferably 1-5 mL, more preferably 2-4 mL of a sample solution with a concentration of 0.1-5 g/L, preferably 0.5-4 g/L, more preferably 0.5-2 g/L of the zinc-based nanohybrid.

In one embodiment, the light has a wavelength of 620-680 nm, preferably 630-670 nm.

In one embodiment, the dye compound is selected from, but not limited to the group consisting of azo dyes and fluorone dyes. In a preferred embodiment, the dye absorbs strongly in the region 350-530 nm, preferably 400-500 nm, and does not absorb in the region 620-680 nm.

EXAMPLES

The present embodiments are being described with reference to specific example embodiments and are included to illustrate but not limit the scope of the invention.

Example 1

Figure 5A:
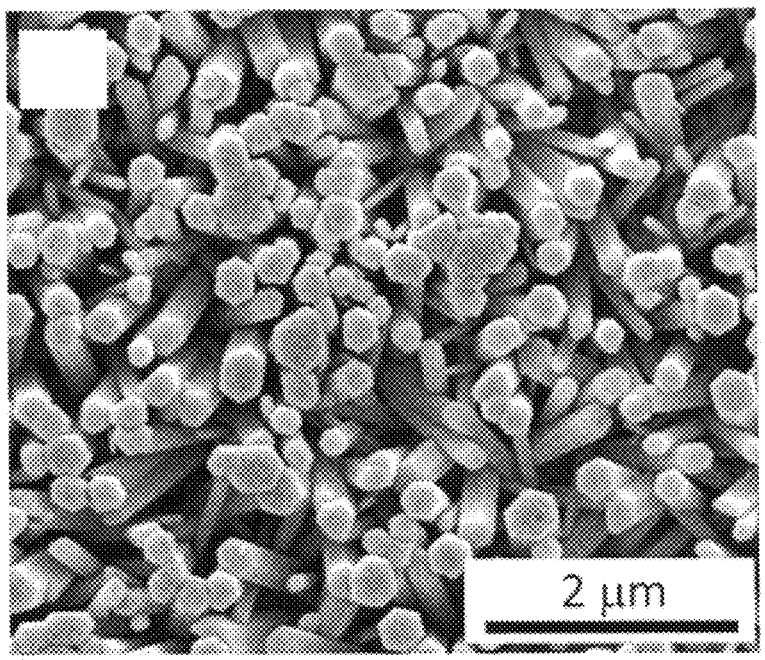
FIG. 5A is the field emission SEM micrograph of ZnO nanorods (NRs) (top view) on a glass plate of the substrate in the water purification prototype.
Figure 5B:
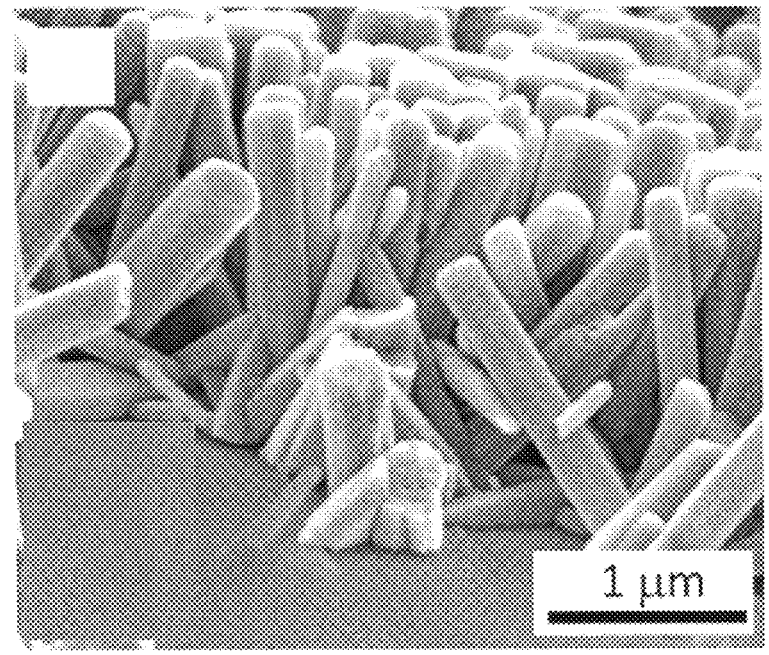
FIG. 5B is the field emission SEM micrograph of ZnO nanorods (NRs) (side view) on a glass plate of the substrate in the water purification prototype.

Synthesis of zinc oxide nanorods: Zinc acetate dihydrate, $Zn(CH_3COO)_2\cdot 2H_2O$ (Merck), zinc nitrate hexahydrate, $Zn(NO_3)_2\cdot 6H_2O$ (Sigma-Aldrich), hexamethylenetetramine, $C_6H_{12}N_4$ (Sigma-Aldrich) were used as the starting materials for a low temperature hydrothermal synthesis of zinc oxide nanorods on fluorine-doped tin oxide plates. A zinc oxide seed thin film was initially deposited on cleaned glass plates by the spray-pyrolysis method at 100° C. using a solution of zinc acetate (10 mM) in isopropanol. The seeded glass plates were then annealed in air at 350° C. for 5 h and used for the hydrothermal growth of the zinc oxide nanorods. An aqueous solution of zinc nitrate (20 mM) and hexamethylenetetramine (20 mM) were used as the precursor solutions for growing zinc oxide nanorods at 90° C. for 40 h. This led to the growth of zinc oxide nanorods of length ca. 2-3 μm and a diameter of 80-100 nm. The field emission SEM micrographs of zinc oxide nanorods are shown in FIG. 5A (top view) and FIG. 5B (side view). In order to maintain a constant growth rate of the zinc oxide nanorods during the hydrothermal process, the old precursor solution was replaced with a fresh solution hourly. The samples were then taken out of the reaction vessel and rinsed thoroughly with deionized water to remove unreacted residues. Finally, the samples were annealed in air at 350° C. for 1 h prior to the study. Detailed processes for the hydrothermal growth of single crystalline zinc oxide nanorods are described in previous reports (S. Baruah, J. Dutta, J. Cryst. Growth 311 (2009) 2549-2554; S. Baruah, J. Dutta, J. Sol-Gel Sci. Technol. 50 (2009) 456-464; S. Sarkar, A. Makhal, K. Lakshman, T. Bora, J. Dutta, S. K. Pal, J. Phys. Chem. C 116 (2012) 14248-14256—each incorporated herein by reference in its entirety). The synthesized nanorods fluoresced at 590 nm due to the intrinsic oxygen vacancy in the material (A. B. Djurišić, Y. H. Leung, K. H. Tam, L. Ding, W. K. Ge, H. Y. Chen, S. Gwo, Appl. Phys. Lett. 88 (2006) 103107—incorporated herein by reference in its entirety).

Example 2

Functionalizing Zinc Phthalocyanine with Bridging Ligands
Functionalizing Zinc Phthalocyanine with Tartrate An aqueous solution of tartrate was stirred with zinc phthalocyanine in chloroform for 12 h. Then the aqueous phase, containing functionalized zinc phthalocyanine, was separated and the fluorescence emission of the zinc phthalocyanine was monitored upon excitation at 633 nm.

Functionalizing Zinc Phthalocyanine with L-Serine

L-serine functionalized zinc phthalocyanine was prepared by following the same procedure as adopted for making of tartrate functionalized zinc phthalocyanine. An aqueous solution of L-serine was stirred with zinc phthalocyanine in chloroform for 12 h. Then the aqueous phase, containing functionalized zinc phthalocyanine, was separated and the fluorescence emission of the zinc phthalocyanine was monitored upon excitation at 633 nm.

Functionalizing Zinc Phthalocyanine with Citrate

Citrate functionalized zinc phthalocyanine was prepared by following the same procedure as adopted for making of tartrate functionalized zinc phthalocyanine. An aqueous solution of citrate was stirred with zinc phthalocyanine in chloroform for 12 h. Then the aqueous phase, containing functionalized zinc phthalocyanine, was separated and the fluorescence emission of the zinc phthalocyanine was monitored upon excitation at 633 nm.

Example 3

Sensitizing zinc oxide nanorods with zinc phthalocyanine via tartrate ligands: The functionalization of zinc oxide nanorods with tartrate ligands was carried out at room temperature in the dark by immersing the glass plates coated with a thin film of zinc oxide nanorods into a 0.5 mM tartrate aqueous solution (pH adjusted to 9 with sodium hydroxide solution) for 12 h. The plates were then washed with distilled water several times. A 0.5 mM zinc phthalocyanine solution, $C_{32}H_{16}N_8Zn$, in a dimethyl sulfoxide (DMSO) was stirred constantly for 1 h prior to the sensitization experiments. The sensitization of the zinc oxide nanorods with zinc phthalocyanine was carried out in darkness and at room temperature by dipping the tartrate-functionalized zinc oxide nanorods into the prepared dye solution for 12 h. After the sensitization process, the zinc oxide nanorods were retracted from the dye solution, rinsed with DMSO-deionized water (50 vol %) mixture thoroughly (in order to remove any adsorbed dye molecules), and stored in darkness for further use.

As FIG. 6A shows a significant spectral overlap (shaded area) between the fluorescence emission spectrum of zinc oxide nanorods and the UV-Vis absorption spectrum of zinc phthalocyanine, the Förster resonance energy transfer (FRET) method could be used to study the zinc-based nanohybrid. The assessment of molecular distances in numerous assemblies from FRET calculations has become a very useful tool (J. R. Lakowicz, Principles of Fluorescence Spectroscopy, 2nd ed., Kluwer Academic/Plenum, N.Y., 1999; T. Bora, K. K. Lakshman, S. Sarkar, A. Makhal, S. Sardar, S. K. Pal, J. Dutta, Beilstein J. Nanotechnol. 4 (2013) 714-725; S. Sarkar, S. Sardar, A. Makhal, J. Dutta, S. Pal, Engineering FRET-Based Solar Cells: Manipulation of Energy and Electron Transfer Processes in a Light Harvesting Assembly, in: X. Wang, Z. M. Wang (Eds.) High-Efficiency Solar Cells, Springer International Publishing 2014, pp. 267-318—each incorporated herein by reference in its entirety). The broad fluorescence emission of zinc oxide nanorods is composed of two bands (FIG. 6B), one arose from doubly charged vacancy center ($V_o^{++}$) located at 610 nm ($P_2$) and the other arose from singly charged vacancy center ($V_o^+$) located at 550 nm ($P_1$) (K. Vanheusden, W. L. Warren, C. H. Seager, D. R. Tallant, J. A. Voigt, B. E. Gnade, J. Appl. Phys. 79 (1996) 7983-7990; A. van Dijken, E. A. Meulenkamp, D. Vanmaekelbergh, A. Meijerink, J. Phys. Chem. B 104 (2000) 1715-1723—each incorporated herein by reference in its entirety). FIG. 6B also shows a significant quenching of the fluorescence emission of zinc oxide nanorods in the zinc-based nanohybrid. The picosecond-resolved emission of the donor zinc oxide nanorods in the presence and absence of the acceptor zinc phthalocyanine were obtained upon excitation of 375 nm laser and monitored at 550 nm ($P_1$) and 610 nm ($P_2$) (FIGS. 6C and 6D respectively). The zinc-based nanohybrid had a shorter excited state lifetime and a reduced emission intensity compared to the zinc oxide nanorods. This observation can be attributed to the efficient non-radiative photoinduced relaxation processes from zinc oxide nanorods to the zinc phthalocyanine. The details of the spectroscopic parameters and the fitting parameters of the fluorescence decay spectra are tabulated in Table 1. From the FRET experiments, the distance between the donor zinc oxide nanorods and acceptor zinc phthalocyanine were calculated to be 3.1-3.3 nm. The energy transfer efficiency is calculated to be 86.2% and 89.3% from $P_1$ and $P_2$ states respectively. The observation is consistent with the fact that $P_2$ ($V_o^{++}$) states are closer to the surface of the zinc oxide nanorods (A. Makhal, S. Sarkar, T. Bora, S. Baruah, J. Dutta, A. K. Raychaudhuri, S. K. Pal, Nanotechnology 21 (2010) 265703—incorporated herein by reference in its entirety).

TABLE 1

Dynamics of picosecond-resolved luminescence transients of zinc oxide nanorods (ZnO NRs), zinc phthalocyanine (ZnPc) and the zinc-based nanohybrid.[a]

| Sample | Excitation wavelength (nm) | Detection wavelength (nm) | $\tau_1$ (ns) | $\tau_2$ (ns) | $\tau_3$ (ns) | $\tau_{av}$ (ns) |
| --- | --- | --- | --- | --- | --- | --- |
| ZnO NRs | 375 | 550 | 0.40 (42.5%) | 2.70 (27.6%) | 31.70 (29.9%) | 10.40 |
| Nanohybrid | 375 | 550 | 0.30 (61.3%) | 1.75 (32.3%) | 10.60 (6.4%) | 1.40 |
| ZnO NRs | 375 | 610 | 0.40 (28.6%) | 2.75 (30.9%) | 31.70 (40.5%) | 13.80 |
| Nanohybrid | 375 | 610 | 0.30 (62.7%) | 1.80 (32.2%) | 14.00 (5.1%) | 1.50 |
| ZnPc | 633 | 680 | 3.40 (100%) | | | 3.40 |
| Nanohybrid | 633 | 680 | 0.05 (93%) | 3.10 (7%) | | 0.25 |

[a]Numbers in the parenthesis indicate relative weightages.

Example 4

Sensitizing zinc oxide nanoparticles with zinc phthalocyanine via tartrate ligands: Sensitized zinc oxide nanoparticles were prepared by following the same procedure as adopted for making sensitized zinc oxide nanorods by replacing zinc oxide nanorods with zinc oxide nanoparticles.

A 0.5 mM zinc phthalocyanine solution in DMSO was stirred constantly for an hour. The functionalization of zinc oxide nanoparticles with tartrate ligands was carried out in the dark at room temperature by adding the nanoparticles to a 0.5 mM tartrate aqueous solution (pH adjusted to 9 with sodium hydroxide) and stirred continuously for 6 h. Then the tartrate-functionalized nanoparticles suspension (1 ml) was added to the 0.5 mM zinc phthalocyanine solution (1 ml) and then stirred for 12 hours in the dark. The solution was then centrifuged for a few minutes and the supernatant clear solution of unattached dyes was removed. The sensitized material was washed with a DMSO-water mixture several times to remove any unattached zinc phthalocyanine molecules. The nanohybrid was then dried in a water bath and stored in the dark until further use.

Figure 2A:
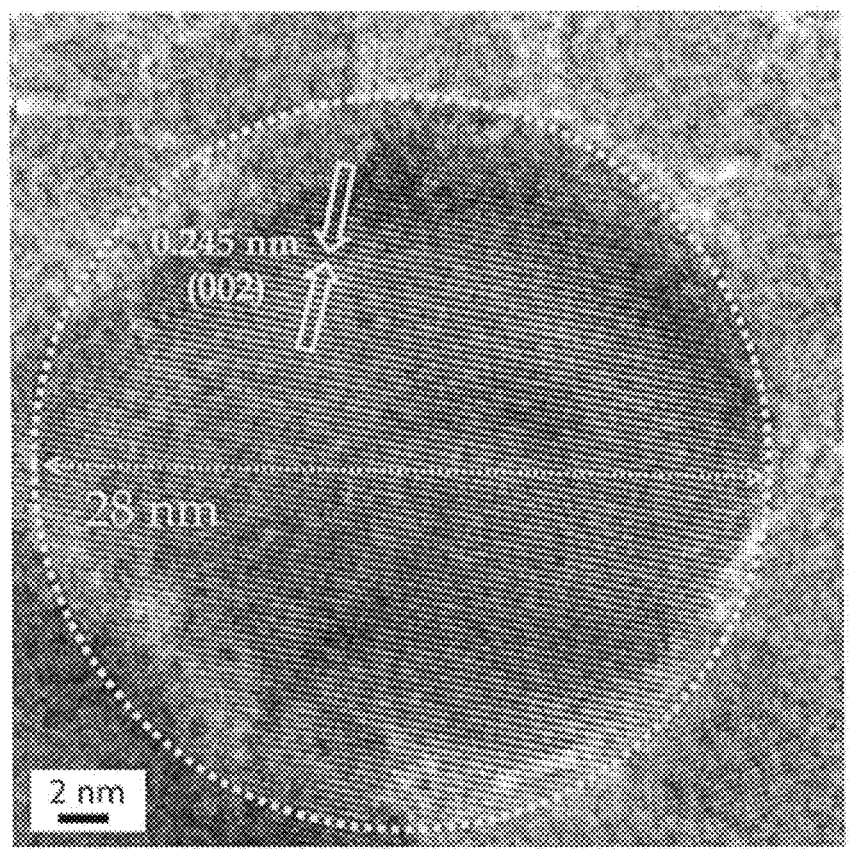
FIG. 2A is a high resolution transmission electron microscopy (HRTEM) micrograph of ZnO nanoparticles (NPs).
Figure 2B:
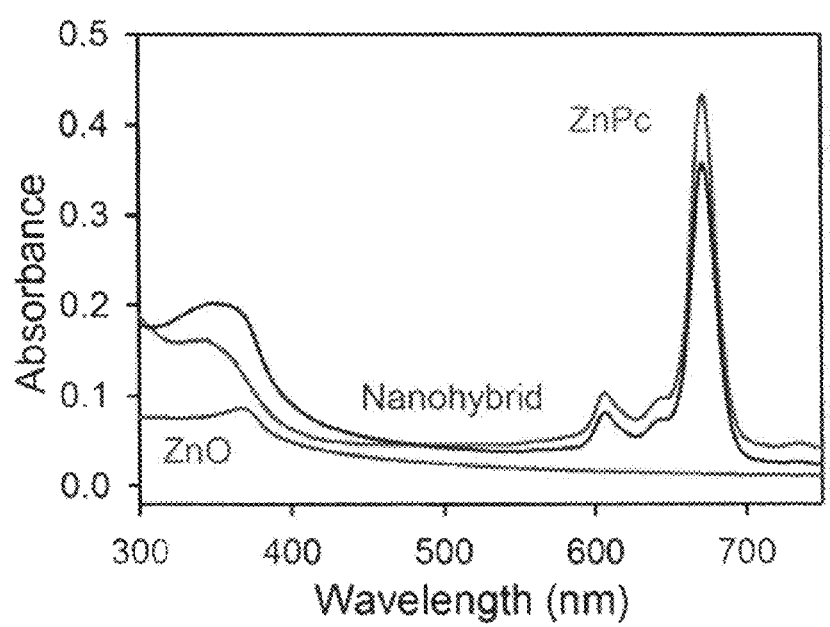
FIG. 2B is a graph that shows the UV-Vis absorption spectra of ZnPc in dimethyl sulfoxide (DMSO), the zinc-based nanohybrid and suspended ZnO NPs.

A typical high-resolution transmission electron microscope (HR-TEM) micrograph of zinc oxide nanoparticles is shown in FIG. 2A. The lattice fringe of the nanoparticles shows an interplanar distance of approximately 0.245 nm, corresponding to the spacing between two (002) planes. It has to be noted that (002) planes are more polar than (100), (101) planes. Mclaren et al. has shown that the terminal polar faces are more active surfaces for photocatalysis than the nonpolar surfaces perpendicular to them (A. McLaren, T. Valdes-Solis, G. Li, S. C. Tsang, J. Am. Chem. Soc. 131 (2009) 12540-12541—incorporated herein by reference in its entirety). The average particle size was estimated to be 28 nm. FIG. 2B is the UV-Vis absorption spectra of zinc phthalocyanine in DMSO, zinc-based nanohybrid and zinc oxide nanoparticles. The UV-Vis absorption spectrum of the zinc-based nanohybrid confirmed the presence of zinc phthalocyanine.

Example 5

Figure 3A:
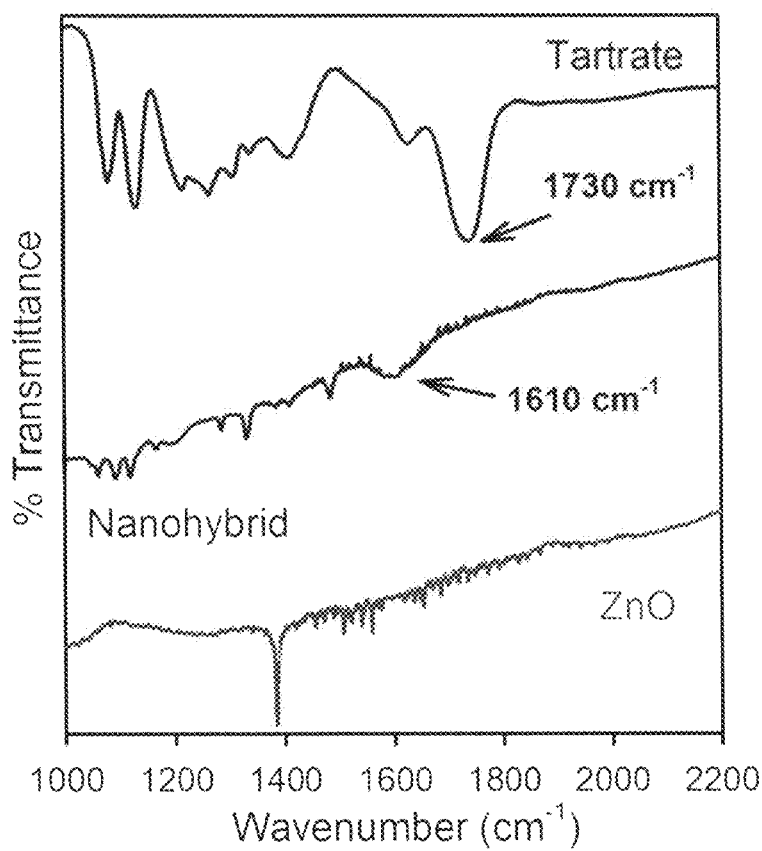
FIG. 3A is a graph that shows the infrared absorption spectra of the zinc-based nanohybrid, ZnO NPs and tartrate.
Figure 3B:
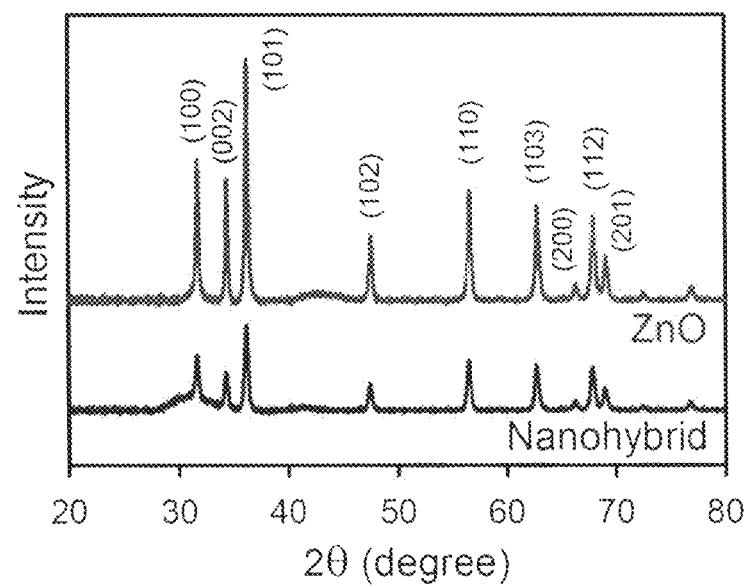
FIG. 3B is a graph that shows the X-ray diffraction (XRD) patterns of the zinc-based nanohybrid and ZnO NPs.

Binding of tartrate ligand to zinc oxide nanoparticles and zinc phthalocyanine: The Fourier transform infrared (FTIR) technique was used to investigate the binding of the carboxylate group of tartrate to the zinc oxide nanoparticles because the attachment is crucial for efficient binding to zinc phthalocyanine, and eventually light-harvesting applications. For a free tartrate molecule, the stretching frequencies of the carboxylic group are at 1730 cm$^{-1}$ (antisymmetric stretch) and 1412 cm$^{-1}$ (symmetric stretch) (FIG. 3A). When tartrate attached to zinc oxide nanoparticles, the stretching frequencies of carboxylate group shifted to 1630 cm$^{-1}$ (antisymmetric stretch) and 1478 cm$^{-1}$ (symmetric stretch). The difference between carboxylate stretching frequencies, $\Delta = v_{as} - v_{sym}$ is useful in identifying the binding mode of the carboxylate ligand (G. B. Deacon, R. J. Phillips, Coord. Chem. Rev. 33 (1980) 227-250—incorporated herein by reference in its entirety). In this case, the shift in the stretching frequencies indicated a bond was formed between tartrate and the zinc oxide nanoparticles (S. Sardar, S. Chaudhuri, P. Kar, S. Sarkar, P. Lemmens, S. K. Pal, Phys. Chem. Chem. Phys. 17 (2015) 166-177—each incorporated herein by reference in its entirety). The observed Δ value for the hybrid material is 152 cm$^{-1}$ which is smaller than that of the free tartrate (318 cm$^{-1}$). This observation revealed that the binding mode of tartrate on the nanoparticles is predominantly bidentate. The XRD study (FIG. 3B) on the nanoparticles (2θ range from 20° to 70°) and upon sensitization with tartrate-functionalized zinc phthalocyanine shows characteristic planes of wurzite ZnO, (100), (002), (101), (102), (110), (103), (200), (112) and (201). The crystallinity of zinc oxide is preserved after sensitization with tartrate-zinc phthalocyanine.

Example 6

Photocatalytic tests: The photocatalytic activity of the nanohybrid under UV-Vis light irradiation has been tested in the photodegradation of methyl orange (a model pollutant)

in water. The photodegradation of methyl orange (initial concentration $C_0=0.3\times10^{-4}$ M) was carried out in a 10-mm optical path quartz cell reactor containing 3.5 mL of a sample solution with a concentration of 1 g/L of the zinc-based nanohybrid. The suspension was irradiated with a red LED (50 W) and xenon lamp (300 W) for UV-visible light, and appropriate amount of aliquots were collected from the reactor at different time intervals.

Figure 4A:
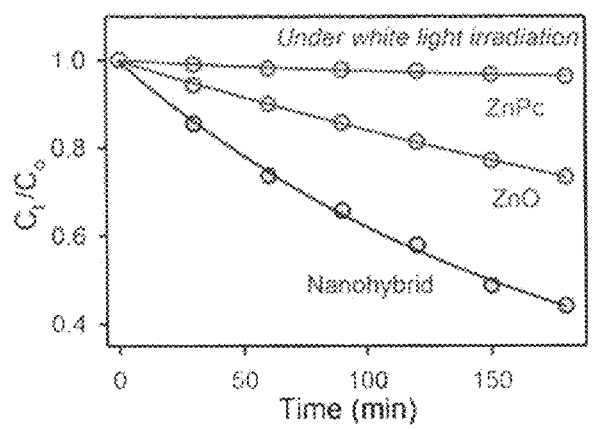
FIG. 4A is a graph that illustrates the photodegradation of methyl orange (MO) in the presence of the zinc-based nanohybrid and ZnO NPs under visible light irradiation. The UV-Vis absorbance, $C_t$, of the sample was monitored and compared with the initial absorbance, $C_0$, of the sample.
Figure 4B:
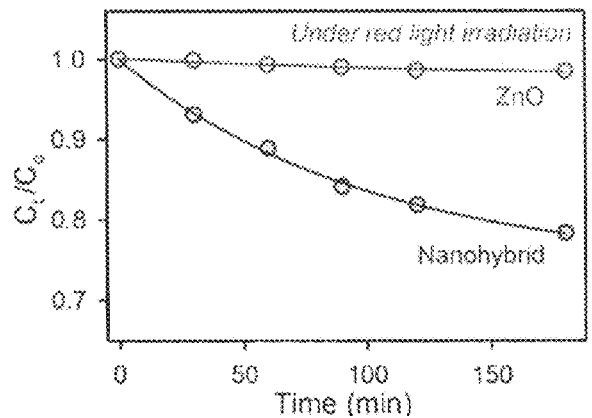
FIG. 4B is a graph that illustrates the photodegradation of MO in the presence of the zinc-based nanohybrid and ZnO NPs under red light irradiation.
Figure 4C:
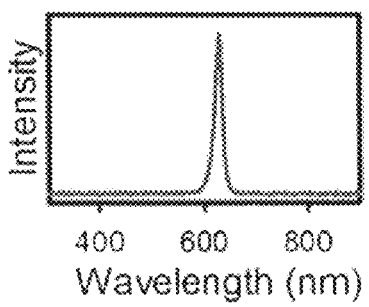
FIG. 4C is a graph that shows the spectrum of the irradiated red light.
Figure 4D:
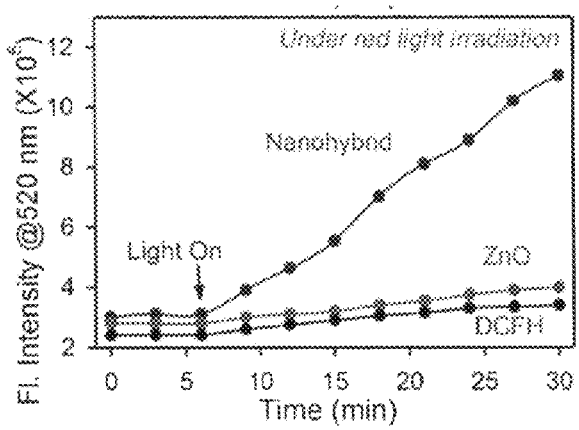
FIG. 4D is a graph that shows the fluorescence intensity of dichlorofluorecein (DCF), an indicator of the amount of ROS present, in the presence of zinc-based nanohybrid and ZnO NPs under red light. The fluorescence intensity of dichlorofluorescin (DCFH), the precursor to DCF, is included as a reference.

FIG. 4A shows the photocatalytic efficiency of the zinc-based nanohybrid under white light irradiation ($\lambda>365$ nm) in aqueous environment. The zinc-based nanohybrid showed significant enhancement in photocatalytic efficiency. The photocatalytic efficiency of the zinc-based nanohybrid under red light irradiation (620 nm) was also monitored and shown in FIG. 4B. The zinc-based nanohybrid exhibited enhanced photocatalytic activity under red light as the photosensitizer absorbs in the same region. Whereas, zinc oxide nanoparticles show no activity under red light because they do not absorb in the near infrared region. This observation is consistent with enhanced photocatalytic activity of other nanohybrids reported in the literature (S. Afzal, W. A. Daoud, S. J. Langford, ACS Appl. Mater. Interfaces 5 (2013) 4753-4759; S. Sardar, S. Sarkar, M. T. Z. Myint, S. Al-Harthi, J. Dutta, S. K. Pal, Phys. Chem. Chem. Phys. 15 (2013) 18562-18570—each incorporated herein by reference in its entirety). The formation of enhanced reactive oxygen species (ROS) in the medium was monitored directly by the dichlorofluorescin-dichlorofluorecein (DCFH-DCF) conversion in aqueous medium (S. Sardar, S. Chaudhuri, P. Kar, S. Sarkar, P. Lemmens, S. K. Pal, Phys. Chem. Chem. Phys. 17 (2015) 166-177—incorporated herein by reference in its entirety). The DCFH is a well-known marker for ROS detection (C. P. LeBel, H. Ischiropoulos, S. C. Bondy, Chem. Res. Toxicol. 5 (1992) 227-231—incorporated herein by reference in its entirety). ROS oxidize non-fluorescent DCFH to fluorescent DCF and the emission intensity of DCF was monitored with time as shown in FIG. 4D. In the presence of nanohybrids, maximum enhancement in fluorescence intensity was observed under red light irradiation. In a control experiment, zinc oxide nanoparticles showed insignificant ROS generation under red light irradiation as these nanoparticles do not absorb in the red region of the UV-Vis spectrum.

Example 7

Photocurrent measurements under white light irradiation: Photocurrent measurements were done using fluorine-doped tin oxide (FTO) plates described in prior art (S. Sardar, S. Sarkar, M. T. Z. Myint, S. Al-Harthi, J. Dutta, S. K. Pal, Phys. Chem. Chem. Phys. 15 (2013) 18562-18570; S. Sardar, S. Chaudhuri, P. Kar, S. Sarkar, P. Lemmens, S. K. Pal, Phys. Chem. Chem. Phys. 17 (2015) 166-177—each incorporated herein by reference in its entirety). Platinum nanoparticles deposited on FTO plates were used as counter electrodes. The platinum nanoparticles were deposited on the FTO plates by thermal decomposition of 5 mM platinum chloride, $H_2PtCl_6$, in isopropanol at 385° C. for 30 min. The zinc-based nanohybrid was used as the photoelectrode, and the two electrodes were placed on top of each other with a single layer of sealant (50 μm, Surlyn 1702 from Dupont) as a spacer between the two electrodes. A liquid electrolyte (1M KCl) was used as the hole conductor, and it filled the inter-electrode space via capillary action, through two small holes (diameter=1 mm) pre-drilled on the counter electrode. Finally, the two holes were sealed by using another piece of surlyn to prevent the leakage of electrolyte. In the experiments, the active area of light exposure was fixed at 1 $cm^2$. The wavelength dependent photocurrent was measured using a homemade setup with a Bentham monochromator and dual light (tungsten and xenon) sources.

Figure 7A:
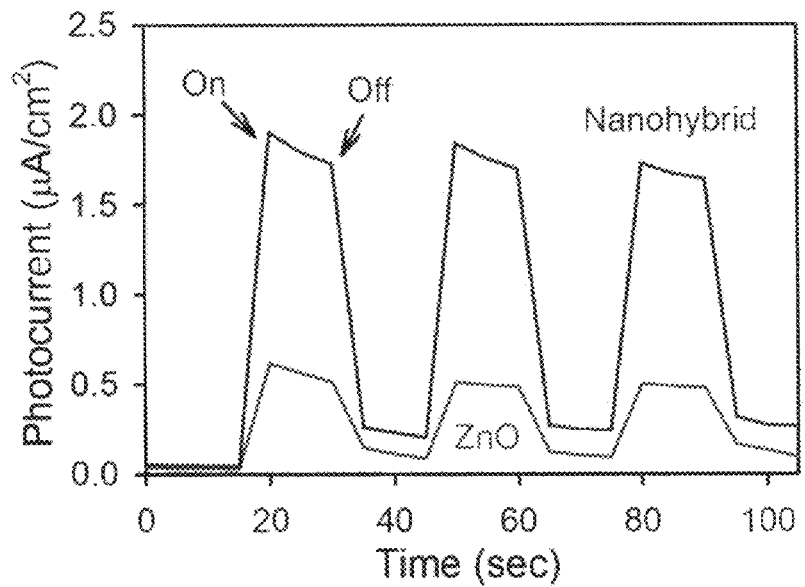
FIG. 7A is a graph that shows the photocurrent response of the zinc-based nanohybrid and ZnO NRs to white light.
Figure 7B:
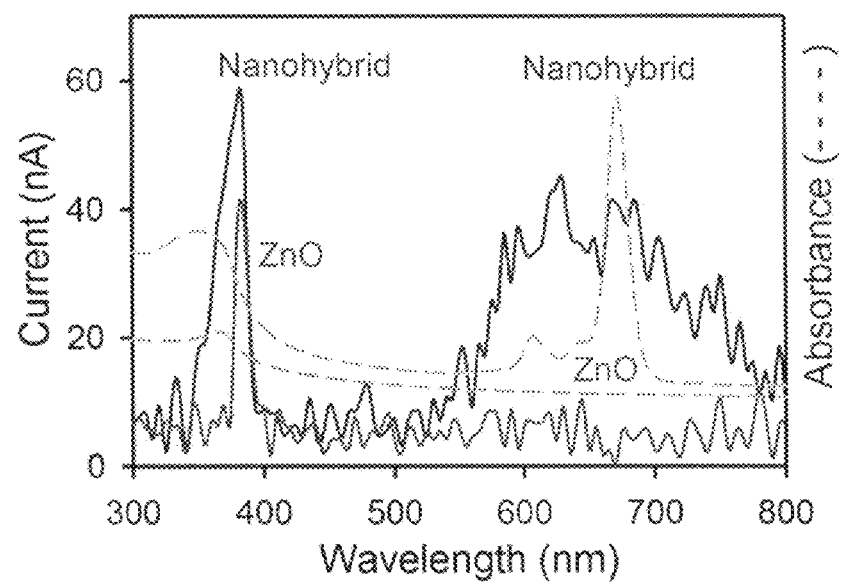
FIG. 7B is a graph that shows the wavelength dependent photocurrent spectra (solid lines) of the zinc-based nanohybrid and ZnO NRs. The absorption spectra of the corresponding samples are shown by the dotted lines.
Figure 8A:
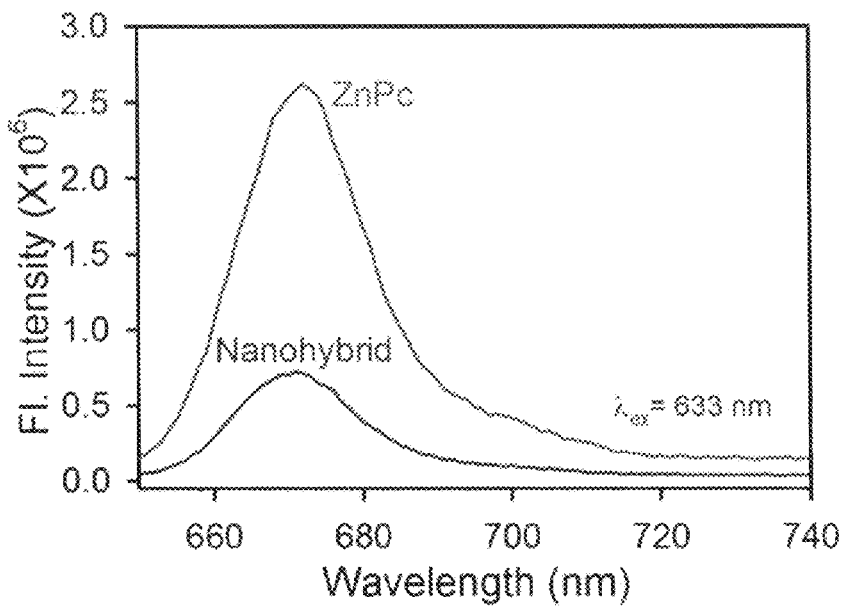
FIG. 8A is a graph that shows the steady-state fluorescence emission of ZnPc in DMSO and in the zinc-based nanohybrid.
Figure 8B:
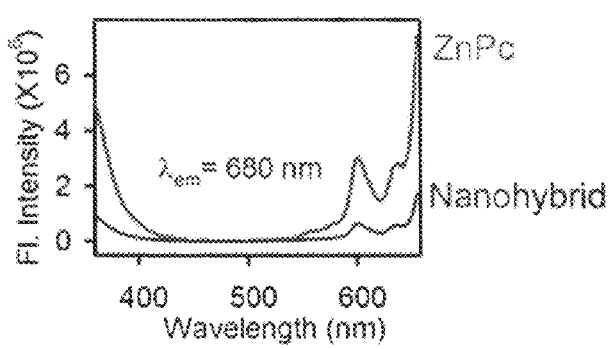
FIG. 8B is a graph that shows the excitation spectra of ZnPc and the zinc-based nanohybrid at 680 nm.
Figure 8C:
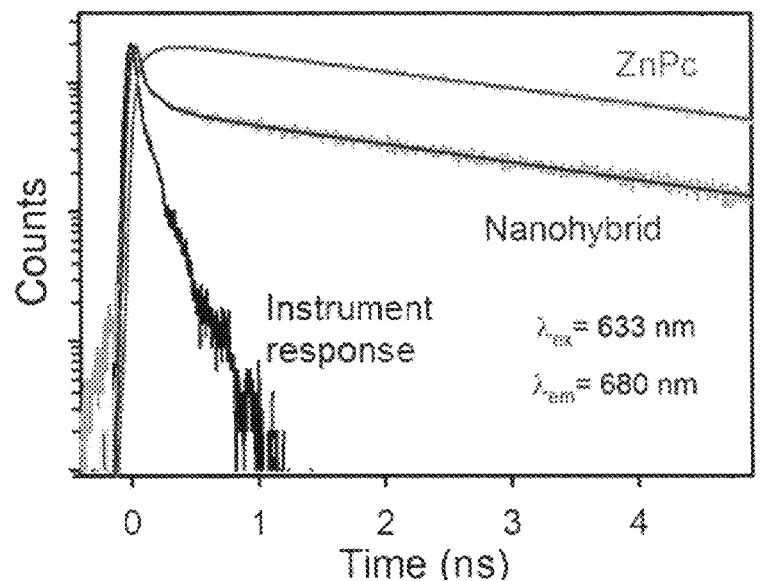
FIG. 8C is a graph that shows the picosecond-resolved fluorescence quenching of ZnPc in the zinc-based nanohybrid coated on a glass plate and ZnPc in DMSO under red laser excitation.

FIG. 7A shows the photocurrent response for the nanohybrid and the zinc oxide nanorods under white light irradiation. An improved photocurrent was observed for the nanohybrid coating (~1.8 μA) under irradiation conditions compared to the zinc oxide nanorod coating (~0.6 μA). The contribution of the zinc phthalocyanine photosensitizer in the charge separation for the better light harvesting near red region is evident from FIG. 7B. The wavelength dependent photocurrent in this device for the sensitized nanorods and the nanoparticles are consistent with the UV-Vis absorption spectra of the corresponding materials. FIG. 8A shows steady-state emission spectra of the nanohybrid and free zinc phthalocyanine in DMSO solution. The concentration of zinc phthalocyanine was maintained at the same level in both cases. A significant quenching of zinc phthalocyanine emission upon red light excitation (633 nm) in the former case compared to the latter one is clearly evident from FIG. 8A, revealing excited state electron transfer from the LUMO of zinc phthalocyanine to the zinc oxide nanorods in the nanohybrid. In order to investigate the molecular basis for the enhanced photocurrent in the red region of the excitation spectrum, which is close to the absorption of the photosensitizer zinc phthalocyanine, picosecond-resolved studies were performed. A direct evidence of excited state electron transfer is revealed from picosecond-resolved fluorescence transients (excitation 633 nm, FIG. 8C). A sharp dip in the emission of nanohybrid in the initial decay indicated an ultrafast photoinduced electron transfer (D. Ino, K. Watanabe, N. Takagi, Y. Matsumoto, J. Phys. Chem. B 109 (2005) 18018-18024; J. He, G. Benko, F. Korodi, T. Polivka, R. Lomoth, B. Akermark, L. Sun, A. Hagfeldt, V. Sundström, J. Am. Chem. Soc. 124 (2002) 4922-4932—each incorporated herein by reference in its entirety).

Example 8

A water purification prototype (FIG. 1B) was built to study the photocatalytic activity of zinc-based nanohybrids. There was a container with water contaminated with methyl orange, a dye. One end of a polytetrafluoroethylene tubing, with an outer diameter of 1 mm, resided in this container, and the other end was connected to the inlet of a pump. Another tubing was connected to the outlet of a pump, and the other end of this tubing was inserted into a substrate. This substrate was made of two stacked glass plates, and the bottom glass plate had a coating of zinc-based nanohybrid, which was sandwiched between the two glass plates. The tubing was inserted between the glass plates along the short edge. Another tubing of the same dimensions was inserted on the opposite edge of the glass plates, and the other end of the tubing led to a receiving container. All sides of the glass plates were sealed with a sealant to prevent water leakage.

Figure 9A:
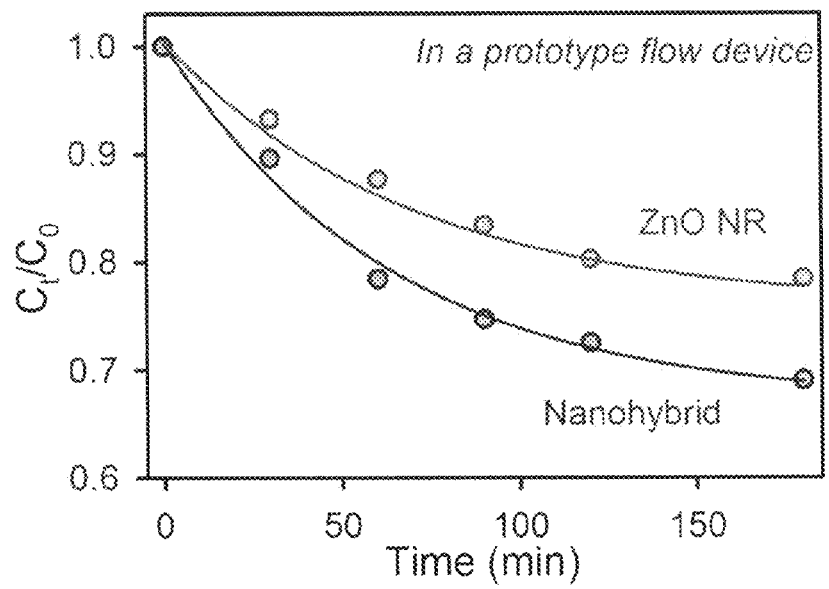
FIG. 9A is a graph that shows the photodegradation of MO under visible light irradiation in the prototype with the zinc-based nanohybrid and with only ZnO NRs.
Figure 9B:
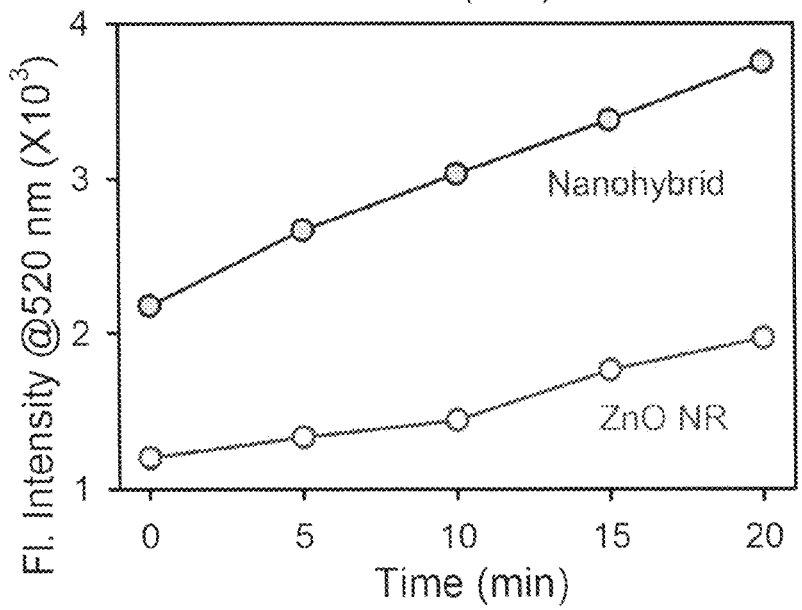
FIG. 9B is a graph that shows the fluorescence intensity of dichlorofluorecein, an indicator of the amount of ROS present, in the presence of zinc-based nanohybrid and ZnO NRs.

While the contaminated water was pumped through the substrate, white light ($\lambda>365$ nm) irradiated the volume of water in the substrate. The UV-Vis absorbance, $C_t$, of the discharge was monitored at 30, 60, 90, 120 and 180 minutes, and compared with the absorbance, $C_0$, of the starting solution (FIG. 9A). A significant enhancement in the catalytic activity is consistent with enhanced generation of photoinduced ROS in the device (FIG. 9B).

The invention claimed is:
1. A zinc nanohybrid, comprising:
a zinc oxide nanostructure;

a zinc phthalocyanine molecule; and
a bridging ligand connecting the zinc oxide nanostructure and the zinc phthalocyanine molecule;
wherein the bridging ligand is of Formula (I):

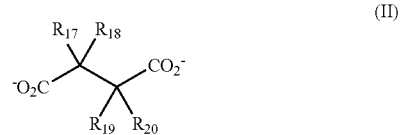
(II)

wherein $R_{17}$-$R_{20}$ are each independently a hydrogen, a halogen, a hydroxyl, an amino, an alkoxy, an aryloxy, a nitro, a cyano, an optionally substituted $C_1$-$C_8$ alkyl, an optionally substituted cycloalkyl, an optionally substituted heterocyclyl, an optionally substituted arylalkyl, an optionally substituted heteroaryl, an optionally substituted alkoxyl, an optionally substituted thioalkoxyl, an optionally substituted aryl, a N-monosubstituted amino group, or a N,N-disubstituted amino group; and wherein the bridging ligand has two terminal carboxylate groups, and through the two terminal carboxylate groups, the bridging ligand forms a first Zn—O linkage with zinc in the zinc oxide nanostructure and a second Zn—O linkage with zinc in the zinc phthalocyanine molecule.

2. The zinc nanohybrid of claim 1, wherein the zinc oxide nanostructure has at least one morphology selected from the group consisting of a nanoparticle, and a nontubular nanorod.

3. The zinc nanohybrid of claim 2, wherein the zinc oxide nanostructure is a nontubular nanorod with an average diameter of 50-100 nm and a length of 0.3-5 μm.

4. The zinc nanohybrid of claim 2, wherein the zinc oxide nanostructure is a nanoparticle with an average diameter of 10-50 nm.

5. The zinc nanohybrid of claim 1, wherein the zinc phthalocyanine molecule is of Formula (I):

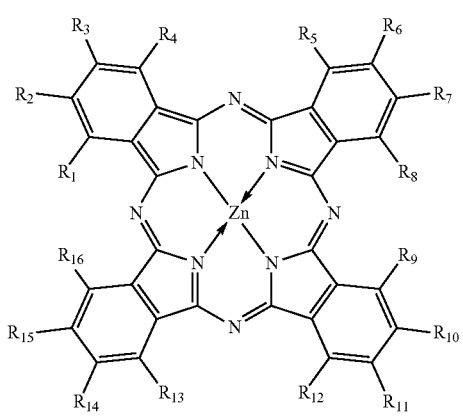
(I)

wherein $R_1$-$R_{16}$ are each independently a hydrogen, a halogen, a hydroxyl, an amino, an alkoxy, an aryloxy, a nitro, a cyano, an optionally substituted $C_1$-$C_8$ alkyl, an optionally substituted cycloalkyl, an optionally substituted heterocyclyl, an optionally substituted arylalkyl, an optionally substituted heteroaryl, an optionally substituted alkoxyl, an optionally substituted thioalkoxyl, an optionally substituted aryl, a N-monosubstituted amino group, or a N,N-disubstituted amino group.

6. The zinc nanohybrid of claim 5, wherein the zinc phthalocyanine molecule is of Formula (1), wherein $R_1$-$R_{16}$ are each hydrogen.

7. The zinc nanohybrid of claim 1, wherein the bridging ligand is selected from the group consisting of tartrate, aspartate, and enantiomers thereof.

8. A substrate comprising:
at least one plate; and
the zinc nanohybrid of claim 1, wherein the zinc nanohybrid is coated on a surface of the plate to form a zinc nanohybrid coating.

9. The substrate of claim 8, wherein the plate is selected from the group consisting of a wafer plate, an indium tin oxide plate, a fluorine-doped tin oxide substrate plate, and a quartz glass plate.

10. The substrate of claim 8, wherein the zinc nanohybrid coating thickness is 0.5-10 μm.

11. The substrate of claim 8, wherein the zinc nanohybrid coating has a surface roughness that is 10-70 nm.

12. The substrate of claim 8, wherein the zinc nanohybrid coating has a porosity of 5-45%.

13. The substrate of claim 8, wherein the zinc nanohybrid coating is porous with an average pore size of 0.1-1 μm.

14. A dye decontamination device, comprising:
the substrate of claim 8;
a container with a dye-containing aqueous solution;
a receiving container configured to collect a decontaminated aqueous solution;
wherein the substrate, the container with the dye-containing aqueous solution, and the receiving container are fluidly connected together;
a pump configured to pump the dye-containing aqueous solution sequentially from the container with the dye-containing aqueous solution through the substrate to the receiving container; and
a light source configured to irradiate the dye-containing aqueous solution that is in contact with the substrate to degrade and remove a dye from the dye-containing solution to form the decontaminated aqueous solution.

15. The dye decontamination device of claim 14, wherein the light source irradiates the dye-containing solution in contact with the substrate with a light having wavelength of 620-680 nm.

16. A method for degrading one or more dye compounds in an aqueous sample, comprising contacting the aqueous sample with the zinc nanohybrid of claim 1 in the presence of light to photodegrade one or more dye compounds.

17. The method of claim 16, wherein the light has a wavelength of 620-680 nm.

18. The method of claim 16, wherein the dye compound is selected from the group consisting of azo dyes and fluorone dyes.

* * * * *